Nov. 6, 1928.
H. A. VALLEZ
HOUSEHOLD FILTER
Filed Jan. 17, 1927
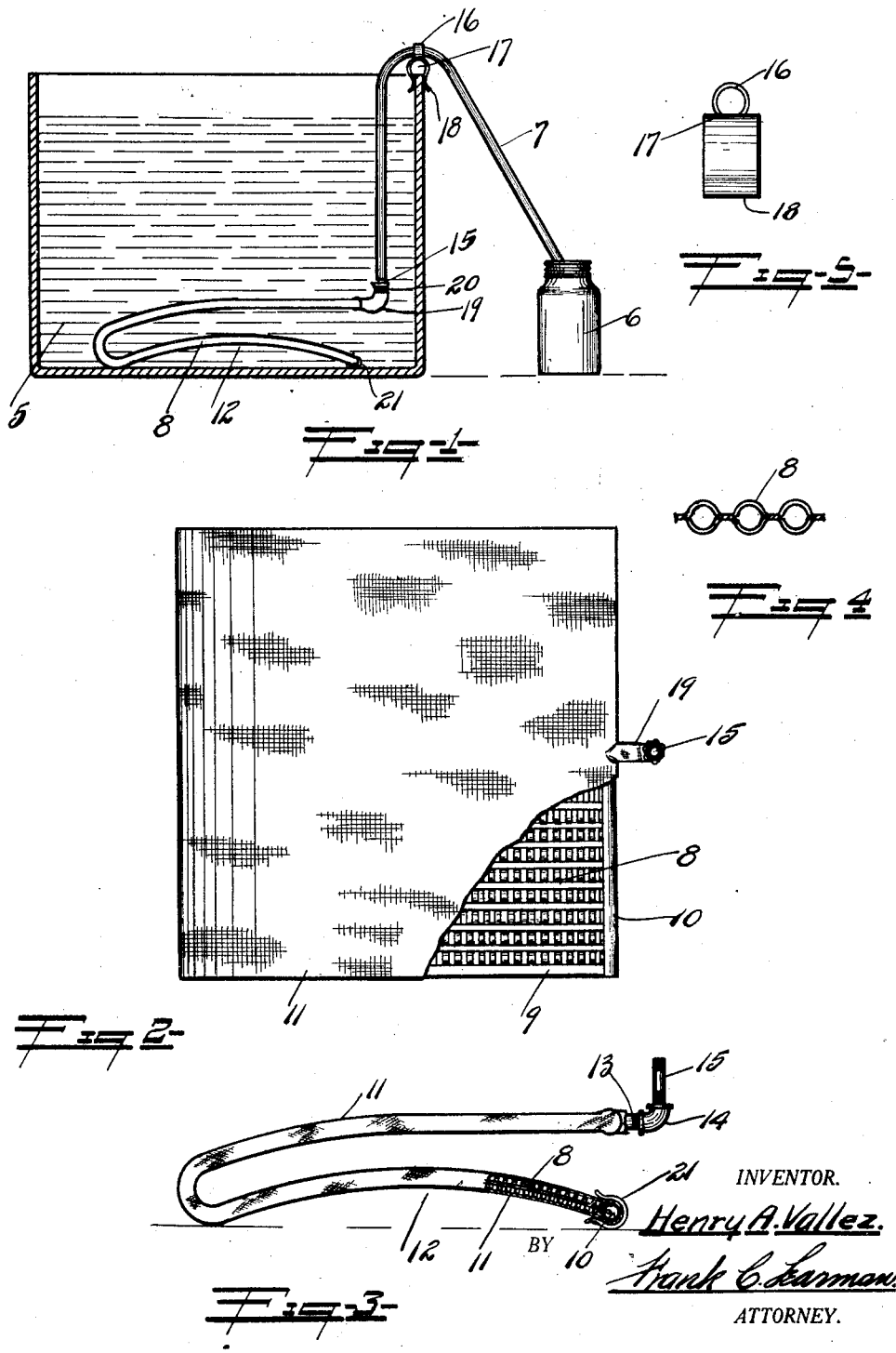
INVENTOR.
Henry A. Vallez.
BY
Frank C. Larmon.
ATTORNEY.

Patented Nov. 6, 1928.

1,690,958

UNITED STATES PATENT OFFICE.

HENRY A. VALLEZ, OF BAY CITY, MICHIGAN, ASSIGNOR TO VALLEZ ROTARY FILTERS COMPANY, OF BAY CITY, MICHIGAN, A CORPORATION OF MICHIGAN.

HOUSEHOLD FILTER.

Application filed January 17, 1927. Serial No. 161,545.

This invention relates to filters, and particularly to a filter for household use for filtering water, jellies, and fruit juices of various kinds.

One object of the invention is to design a simple, practical and efficient filter, which can be placed in an open receptacle, and so shaped that a maximum filtering area can be obtained in a minimum space.

Another object is to design a filter from which the filter cloth can be easily removed or replaced, and which can be readily and easily cleaned and reassembled.

A further object is to design a small and compact household filter, which will be economical to manufacture, simple to set up, and efficient in operation.

The above and other objects will appear as the specification progresses, reference being had to the accompanying drawing in which I have shown the preferred embodiment of my invention, and in which like reference numerals indicate like parts throughout the several views thereof.

In the drawing:

Fig. 1 is a side view showing my improved filter assembled in a suitable receptacle, the receptacle being shown in section.

Fig. 2 is an enlarged plan view of the filter element proper, a section of the filter cloth being removed to show the element.

Fig. 3 is an edge view, sections of cloth being removed to show the several parts.

Fig. 4 is an enlarged fragmentary detail of the filter screen.

Fig. 5 is a side view of the hose holder.

Referring now particularly to the drawing in which is shown the preferred embodiment of my invention, the numeral 5 indicates a receptacle of the conventional type in which the filter is placed, and which is adapted to receive the liquid to be filtered, a fruit jar 6 being placed adjacent thereto and into which the filtered liquid is siphoned through the hose 7 which connects to the filter in a manner to be presently described.

The filter element proper comprises a section of perforated metal 8, formed with a solid marginal side 9, which can be reinforced if desired, an elongated rounded clip member 10 being soldered or spot welded to the ends, to permit the filter sack 11 to be stripped thereover.

The filter element is preferably made in folds, and is bowed as shown at 12, so that when it is placed in a receptacle, only two small sections thereof rest on the bottom of the receptacle, permitting the liquid to freely circulate beneath the bottom fold, and utilizing the entire filtering area of the element, if this fold were perfectly flat, this entire bottom surface would be dead, and the filtering area of the filtering element would be cut down accordingly.

A short nipple 13 is soldered to one of the members 10, and a pipe elbow 14 is threaded thereon, another section of pipe 15 being threaded in and projecting from the member 14, and to which one end of the hose 7 is connected, said tube leading over the top of the receptacle and is loosely mounted in a hose support 16 formed integral with the clamp 17, said clamp comprising spaced apart resilient wings 18 which resiliently engage the edge of the receptacle.

The filtering element is completely encased by the filter sack 11 which is provided with a neck 19 adapted to slip over the pipe 15 and is rigidly secured thereto by means of a cord or fine wire 20 to prevent leakage at this point. The filter sack strips over the fold, the upper end of the filtering element completely covering said element, the open end being folded over and is held in position by means of a resilient clamp 21 in the usual manner.

Where greater capacity is required, additional folds can be added, the length of the filter sack being increased accordingly, the filter is however especially designed for household use, and I find that one fold gives ample filtering area, the filter sack is easily removed and replaced, and all parts can be readily cleaned.

From the foregoing description it will be obvious that I have perfected a very simple, economical and convenient household filter for filtering jellies, juices and liquids of various kinds.

What I claim is:—

1. A filter comprising a perforated folded rigid screen, the lower fold being bowed and spaced from the upper fold.

2. A filter comprising a continuous perforated folded rigid screen, the lower fold being bowed and spaced from the upper fold, a filter sack enclosing said screen, and a resilient clamp for closing the end of the filter bag.

3. A filter adapted to be mounted in an open receptacle and comprising a perforated folded rigid screen, the lower fold being bowed and spaced from the upper fold, and an outlet at the end of said upper fold.

4. A filter adapted to be placed in a receptacle and comprising a continuous perforated folded rigid screen, the lower fold being bowed and spaced from the upper fold, a pipe connection to the end of the upper fold, a filter sack covering said screen, and a hose connected to said pipe.

5. A filter comprising a continuous folded perforated rigid screen, the lower fold being bowed and spaced from the upper fold, a discharge connection connected to the end of the upper fold, a filter sack enclosing said screen, a resilient clip for closing the open end of the sack, and a hose attached to the discharge connection.

In testimony whereof I hereunto affix my signature.

HENRY A. VALLEZ.